(12) United States Patent
Simske et al.

(10) Patent No.: US 6,683,984 B1
(45) Date of Patent: Jan. 27, 2004

(54) DIGITAL IMAGING DEVICE WITH BACKGROUND TRAINING

(75) Inventors: Steven J Simske, Greeley, CO (US); John Mark Carleton, Fort Collins, CO (US); Richard R Lesser, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 602 days.

(21) Appl. No.: 09/628,542

(22) Filed: Jul. 31, 2000

(51) Int. Cl.[7] .............................. G06K 9/46; G06K 9/48; G06K 9/36
(52) U.S. Cl. ..................... 382/190; 382/199; 382/276; 382/278
(58) Field of Search ................................. 382/151, 190, 382/181, 195, 199, 203, 206, 209, 287, 291, 218, 276, 277, 278, 305; 358/453, 464, 487, 488

(56) References Cited

U.S. PATENT DOCUMENTS

| | | | | |
|---|---|---|---|---|
| 4,180,831 A | * | 12/1979 | Morton et al. | 382/190 |
| 4,823,395 A | | 4/1989 | Chikauchi | 382/48 |
| 4,908,716 A | | 3/1990 | Sakano | 358/453 |
| 5,034,991 A | * | 7/1991 | Hagimae et al. | 382/209 |
| 5,097,517 A | * | 3/1992 | Holt | 382/137 |
| 5,377,019 A | | 12/1994 | Okisu et al. | 358/464 |
| 5,583,950 A | * | 12/1996 | Prokoski | 382/212 |
| 5,818,976 A | | 10/1998 | Pasco et al. | 382/289 |
| 5,880,858 A | | 3/1999 | Jin | 358/487 |
| 5,901,253 A | | 5/1999 | Tretter | 382/289 |
| 5,933,527 A | * | 8/1999 | Ishikawa | 382/190 |
| 5,974,199 A | | 10/1999 | Lee et al. | 382/289 |
| 5,978,519 A | | 11/1999 | Bollman et al. | 382/282 |
| 6,011,635 A | | 1/2000 | Bungo et al. | 358/488 |
| 6,064,768 A | * | 5/2000 | Hajj et al. | 382/195 |
| 6,272,244 B1 | * | 8/2001 | Takahashi et al. | 382/190 |
| 6,335,985 B1 | * | 1/2002 | Sambonsugi et al. | 382/190 |
| 6,381,365 B2 | * | 4/2002 | Murakawa | 382/190 |
| 6,385,340 B1 | * | 5/2002 | Wilson | 382/218 |

OTHER PUBLICATIONS

Friedrich M. Wahl, Kwan Y. Wong and Richard G. Casey; "Block Segmentation And Text Extraction in Mixed Text/Image Documents"; Computer Graphics And Image Processing 20; pp. 375–390; Received Jan. 18, 1982, revised Feb. 4, 1982.

* cited by examiner

Primary Examiner—Andrew W. Johns
Assistant Examiner—Amir Alavi
(74) Attorney, Agent, or Firm—Augustus W. Winfield (57) ABSTRACT

Various backgrounds, forms, or templates are scanned, features are extracted, and the features are stored in memory. When a composite image is scanned (image of interest plus part of background), features are extracted from the composite image. Features in the composite image are correlated to stored background features to identify which background is present. If necessary, background features from memory are shifted in two dimensions to accommodate displacement of the background. Features corresponding to the background are deleted from the features in the composite image. For forms and templates, features are used to identify the background, and then the information is directly extracted from the composite image.

5 Claims, 12 Drawing Sheets

| akfja aiergs akjfa 184195 | jrusin sijgnk akjigk | 19857 | qoiwtna aijre aijenf aiient aifab qotjo znvzlz zcknvz poino w bwpon wbown wponbw sijgf sbwslkn wpeomblwml siomfb sowpm szvnoai amdklf

~800

~900
91247
917497
015809
26998
20956
209846
0962809
16487
250890

17846
17394
092658
2309098
4098-8
234809
243-8
0542
20485084

FIG. 9 akfja aiergs akjfa 184195    jrusin sijgnk akjigk    19857 qoiwtna aijre aijenf aiient aifab qotjo znvzlz zcknvz poino w bwpon wbown wponbw sijgf sbwslkn wpeomblwml siomfb sowpm szvnoai amdklf

DIGITAL IMAGING DEVICE WITH BACKGROUND TRAINING

FIELD OF INVENTION

This invention relates generally to automatic image analysis, and more specifically to distinguishing between an area of interest and a background.

BACKGROUND OF THE INVENTION

Image scanners convert a visible image on a document or photograph, or an image in a transparent medium, into an electronic form suitable for copying, storing or processing by a computer. An image scanner may be a separate device, or an image scanner may be a part of a copier, part of a facsimile machine, or part of a multipurpose device. Reflective image scanners typically have a controlled source of light, and light is reflected off the surface of a document, through an optics system, and onto an array of photosensitive devices. The photosensitive devices convert received light intensity into an electronic signal. Transparency image scanners pass light through a transparent image, for example a photographic positive slide, through an optics system, and then onto an array of photosensitive devices. The invention is also applicable to digital cameras, for example, in configurations for imaging documents.

A document or other object being imaged typically does not occupy the entire field of view of the image scanner. Typically, a scanned image includes an image of interest (such as a document or photograph) and portions of a background. For example, for a reflective scanner with an automatic document feeder, the background may include portions of the automatic document feeder mechanism. For a second example, a camera looking down onto a document on a desktop may image the document of interest, and parts of the desk, and perhaps parts of other materials that are at least partially within the field of view. There is a general need to extract the image of interest from the rest of the scanned image.

Some known methods for extracting an image from a background take advantage of a known contrasting background. In U.S. Pat. No. 4,823,395, the background is black, and a white margin on a manuscript provides a contrasting edge for edge detection. Likewise, in U.S. Pat. No. 5,818,976, the optical characteristics of the background contrast with the optical characteristics of the pages to be scanned, where the contrasting background may be a shade of gray, a contrasting color, or a pattern of lines or dots. In U.S. Pat. No. 5,901,253, the scanned image is compared to a reference scan line of the background. In U.S. Pat. No. 5,880,858, a background image is obtained by scanning with no document present, and then in a scanned image including a document, pixels corresponding the background are subtracted. In U.S. Pat. No. 5,978,519, an image is cropped to include portions having variable intensity levels, and portions having uniform intensity levels are excluded from the cropped image.

Other methods are directed to removing an image of an object that overlaps the image of interest. For example, in U.S. Pat. Nos. 5,377,019 and 6,011,635, open books are imaged by a camera looking down, and thumbs and fingers of a human operator holding the book open may overlap the image of the pages. The fingers are distinguished from the book by contrasting color, and contrasting shape (curved edges).

In general, scanning devices may not be able to assume that one predetermined background is present. For example, consider a removable automatic document feeder. Sometimes the feeder is present and sometimes it is not. Alternatively, a slide adapter may be used instead of an automatic document feeder. There is a need for an image processing system that can extract an image of interest from a background, where the background may vary from one scan to the next. One approach is have a unique identifier on lids and adapters. However, if a new device is introduced after the scanner is manufactured, either hardware or software must be updated to recognize the new device. Another approach is to scan the background before each scan of an image of interest. However, scanning a background in advance of every scan adds time to the scan.

In addition, scanning devices may not be able to assume that a background is stationary from one scan to the next. For example, if a device is removed and replaced, the repeatability of the mechanical alignment may be such that the device position is slightly shifted from one time to another. Alternatively, some devices may be placed onto a scanner manually with very little precision in location.

There is a need for an image processing system that can extract an image of interest from a background, where the background may vary from one scan to the next, and where a new background may be used, and where a known background may be shifted in two dimensions.

SUMMARY OF THE INVENTION

Various backgrounds, forms, or templates are scanned, features are extracted, and the features are stored in memory. When a composite image is scanned (image of interest plus part of background), features are extracted from the composite image. Features in the composite image are correlated to stored background features to identify which background is present. If necessary, background features from memory are shifted in two dimensions to accommodate displacement of the background. Image data corresponding to the background is deleted from the composite image. The invention is also applicable to extraction of information that has been added to a blank form.

DETAILED DESCRIPTION OF THE PREFERRED EMBODIMENT OF THE INVENTION

Figure 1:
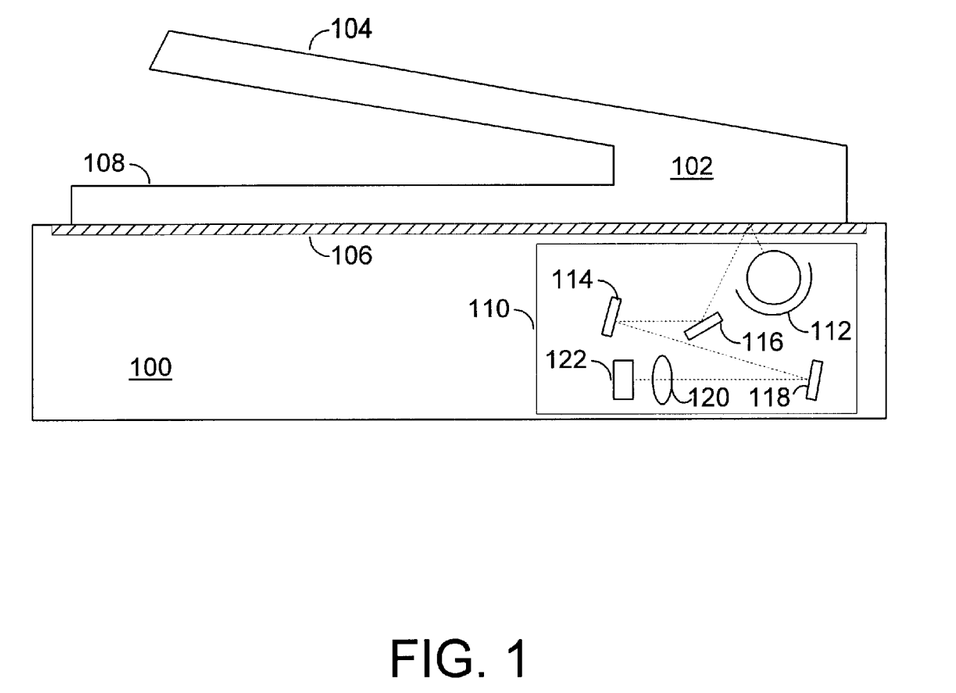
FIG. 1 is a cut-away side view of an image scanner with a removable automatic document feeder.

FIG. 1 illustrates an image scanner 100, with an automatic document feeder 102. The scanner in FIG. 1 is only an example for purposes of illustration, and the patent is applicable to many other configurations of image scanners. In the scanner of FIG. 1, documents, photographs, or other items to be scanned are placed into an input tray 104, where they are fed face down onto a transparent platen 106, and then after scanning are returned to an output tray 108. The scanner 100 includes an optical assembly 110 for imaging a item on the platen 106. The optical assembly includes, as an example, an illumination source 112, multiple mirrors (114, 116, 118) to fold an optical path, an objective lens 120, and a photosensor array 122. Note that sizes of optical components in FIG. 1 are exaggerated to facilitate illustration. The lens 120 focuses a single line on the surface of the platen 102 onto a row of photosensors on the photosensor array 122. The depth of field for the scanning optics 110 typically enable focused scanning of items that may be a few centimeters above the surface of the platen. There may be multiple rows of photosensors.

Figure 2:
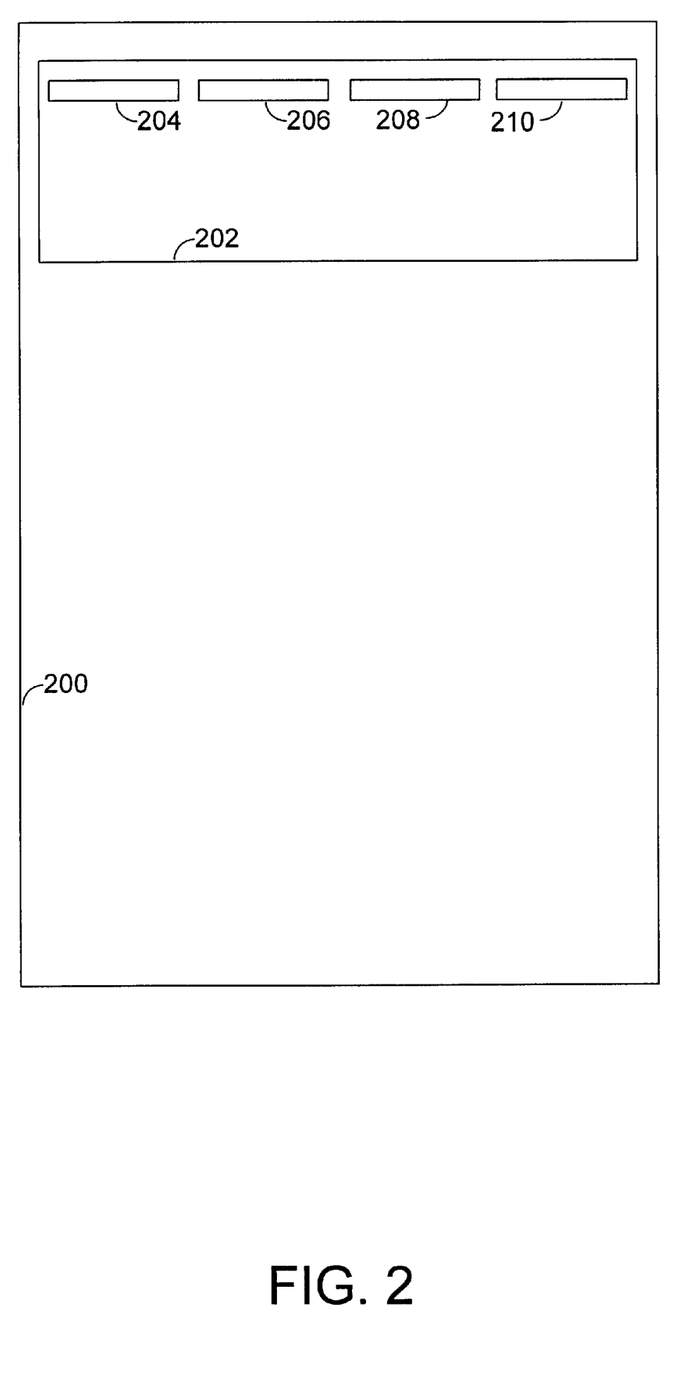
FIG. 2 is a scanned image of the bottom of the automatic document feeder of FIG. 1.

FIG. 2 illustrates a scanned image of the automatic document feeder 102, with no document present. The automatic document feeder may include rollers (not illustrated in FIG. 1) or other mechanical components or lines that are visible, through the platen, to the scanning optics of the scanner. In FIG. 2, rectangle 200 is the perimeter of the platen (FIG. 1, 106), rectangle 202 is a visible line on the bottom of the automatic document feeder (FIG. 1, 102), and rectangles 214–210 are visible rollers near the bottom of the automatic document feeder.

Figure 3:
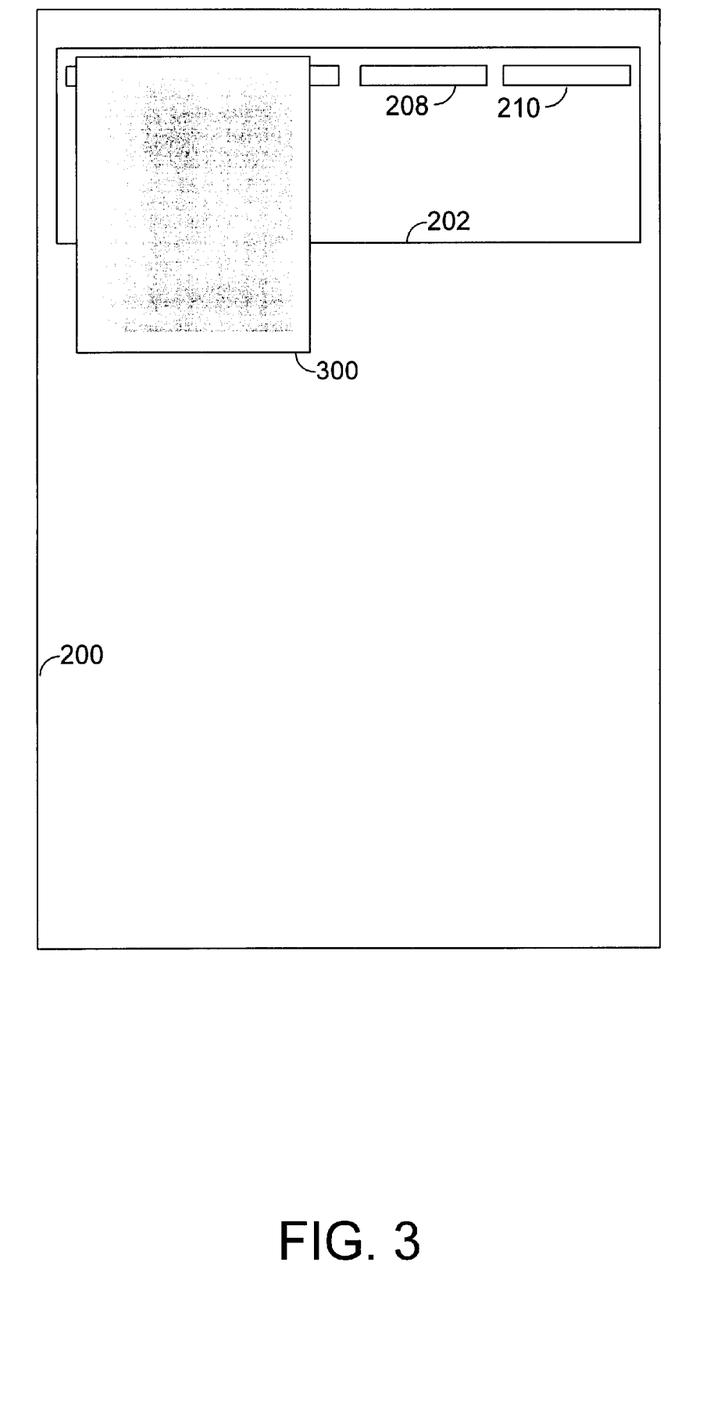
FIG. 3 is a scanned image of a photograph and part of the bottom of the automatic document feeder of FIGS. 1 and 2.

FIG. 3 illustrates a scanned image of a photograph 300, and part of the automatic document feeder visible in FIG. 2 is visible in FIG. 3. In particular, part of the line 202, and part of rollers 214 and 206 (see FIG. 2) are visible outside the boundaries of the photograph, and all of rollers 208 and 210 are visible.

The automatic document feeder 102 illustrated in FIGS. 1–3 may be removable, and other lids or mechanisms may be attached to the scanner. Examples include transparency adapters, photo adapters, slide adapters, and templates for holding multiple photographs or business cards. If the automatic document feeder is removed, and then reattached, then the absolute position of elements 202–210 in FIG. 3 may shift slightly. Alternatively, a small slide adapter may be simply placed on the platen manually with very little precision in placement. One goal of the invention is to distinguish an image of interest, such as photograph 300 in FIG. 3, from a background, such as elements 202–210 in FIG. 2. An additional goal is to distinguish the image of interest even if the elements of the background are shifted. Accordingly, multiple backgrounds that are expected to used multiple times, are imaged, and features of the background images are stored. Then, when an image of interest is scanned, along with the background, features of the composite image are compared to the stored features to see if a known background is present. If a known background is present, the background portion is deleted from the composite image, leaving only the image of interest. The invention is also applicable to forms. That is, a blank form may be scanned as a background. The background form may then be deleted from information that has been added to a filled-in form.

One well known feature that can be extracted from a image using image analysis is an edge. The following is one example of an edge detection algorithm. Consider a pixel P(i,j), surrounded by eight nearest neighboring pixels, as follows:

| P (i − 1, j + 1) | P (i, j + 1) | P (i + 1, j + 1) |
| P (i − 1, j)     | P (i, j)     | P (i + 1, j)     |
| P (i − 1, j − 1) | P (i, j − 1) | P (i + 1, j − 1) |

Pixel P(i,j) is designated as an edge pixel if the sum of the absolute value of the differences between P(i,j) and its eight nearest neighbors is greater than a threshold. That is:

$$\sum |P(i, j) - P(\text{neighbor})| > \text{Threshold}$$

For example, for 8-bit intensity values, a default threshold value of 100 provides suitable edge discrimination for many images. The threshold may be adjusted manually or automatically as appropriate for relatively uniform backgrounds or relatively non-uniform backgrounds. A binary edge map may then be made as follows: if a pixel is designated as an edge pixel, it may be assigned a value of "one", and if a pixel is not designated as an edge pixel, it may be assigned a value of "zero". When using the above algorithm, the width of the resulting edge lines (areas having a value of "one") tends to be relatively wide. However, in general, because lines from scan to scan may not align perfectly, wide edge lines may be desirable for the image analysis discussed below. Where needed, wide edge lines can be "thinned" by iteratively removing pixels along the edges of the lines.

Note that binary edge maps require little memory for storage. In addition, for purposes of the invention, edge maps of the background do not need to have high resolution, and may be derived from low resolution scans of the background. Also, for purposes of the invention, edge lines do not have to be continuous, and breaks in the edge lines are acceptable.

A low resolution binary edge map may be computed and stored for each of the expected backgrounds. A low resolution binary edge map may also be computed for the composite image. Then, a two-dimensional cross-correlation may be performed between the binary edge map of the composite image and the binary edge map of each of the stored backgrounds. Regions with no edges can be ignored. That is, to reduce computation time, preferably only regions with edges in the background are used for cross-correlation. For example, in FIGS. 2 and 3, the cross-correlation computation may be limited to the region defined by rectangle 202. The highest peak correlation value for the set of correlations will indicate which background is most likely included in the composite image. Any offset of the peak of the correlation from the center of the two dimensional correlation result indicates a shift in position of the background between scans.

Given a background match, and a position shift from cross-correlation, the appropriate background edge map can be shifted, and then compared to the composite image edge map. In the following example comparison methods, assume that "A" is a pixel in a composite edge map, "B" is a pixel in a background edge map, and "RESULT" is an edge map resulting from the comparison. A first comparison method is the following mapping (A$\overline{\text{B}}$):

| A | B | RESULT |
|---|---|---|
| 0 | 0 | 0 |
| 0 | 1 | 0 |
| 1 | 0 | 1 |
| 1 | 1 | 0 |

A second comparison method is the following mapping (Exclusive-OR):

| A | B | RESULT |
|---|---|---|
| 0 | 0 | 0 |
| 0 | 1 | 1 |
| 1 | 0 | 1 |
| 1 | 1 | 0 |

For the first comparison method, a pixel is set to binary one in the resulting edge map only if: (a) it is set to one in the composite edge map and (b) it is not set to one in the background edge map. In the second comparison method, a pixel is set to one in the resulting edge map only if it is set to one in either the composite edge map or the background edge map, but not both. As will be discussed further below, the first comparison method is particularly useful for edge maps, and the second comparison method is particularly useful for extraction of information from forms or templates.

Figure 4:
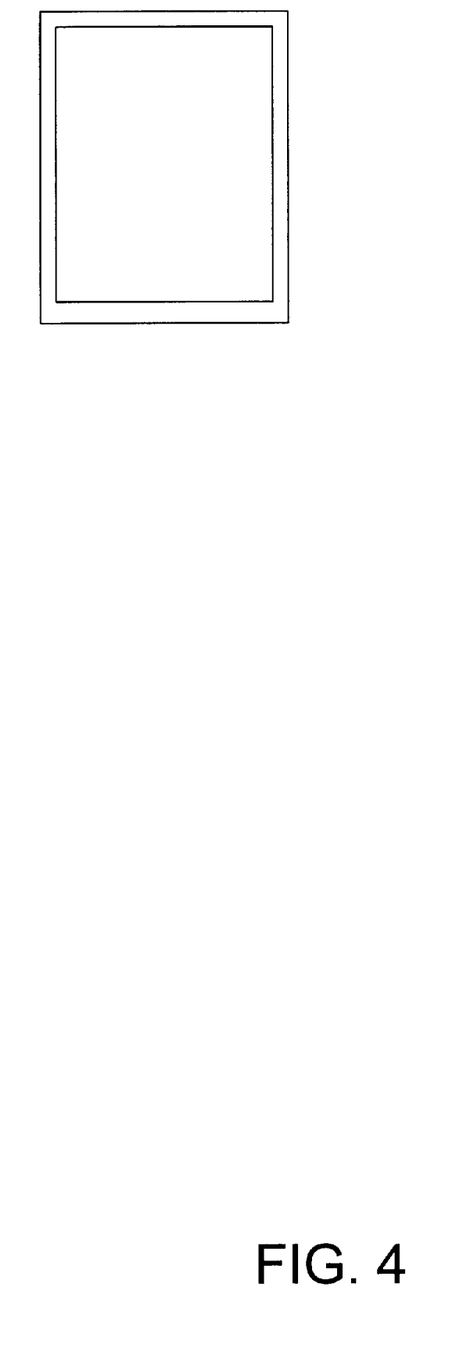
FIG. 4 is an edge map of the image of FIG. 3 after image analysis to remove the background.

FIG. 4 illustrates the application of the first comparison method to edge maps of the images depicted in FIGS. 2 and 3. In FIG. 4, no part of the background is visible. Not apparent in FIG. 4 are small gaps in the edge lines where pixels in the edge lines for the photograph are mapped to zero because of crossing edge lines in the background edge map. Note that in FIG. 3, the photograph 300 is depicted as having a white margin and a non-white photo. If the photograph has areas along the edges that are white, some parts of the interior rectangle may not map to edge pixels. However, the outer rectangle, even with small gaps, will be sufficient to indicate the area of the image of interest.

The result of the first comparison method will clearly show the edges of the photograph (FIG. 3, 300), but will also include small areas of noise. One source of noise is pixels that partially include an edge. For example, assume a black area on a white background. Some pixels are all black, some pixels are all white, but a few partially illuminated pixels on the boundary of black-to-white may be gray. Which pixels are partially illuminated may change from scan to scan, particularly if there is any position shift between scans. One way to remove noise is to eliminate binary ones in the resulting comparison image that are adjacent to edges in the background edge map. Another way to remove the noise is to eliminate any areas, of binary ones, that are less than a minimal size. That is, any areas of contiguous binary ones having, for example, four or fewer ones may be eliminated.

Once noise is removed, it may be desirable to fill in small gaps that result from the comparison computation. Gap filling methods, also known as smearing, are known, particularly for application in optical character recognition. See, for example, F. M. Wahl, K. Y. Wong, R. G. Casey, "Block Segmentation and Text Extraction in Mixed Text/Image Documents", *Computer Graphics and Image Processing*, v 20, n 4, December 1982, p 375–390.

Figure 5:
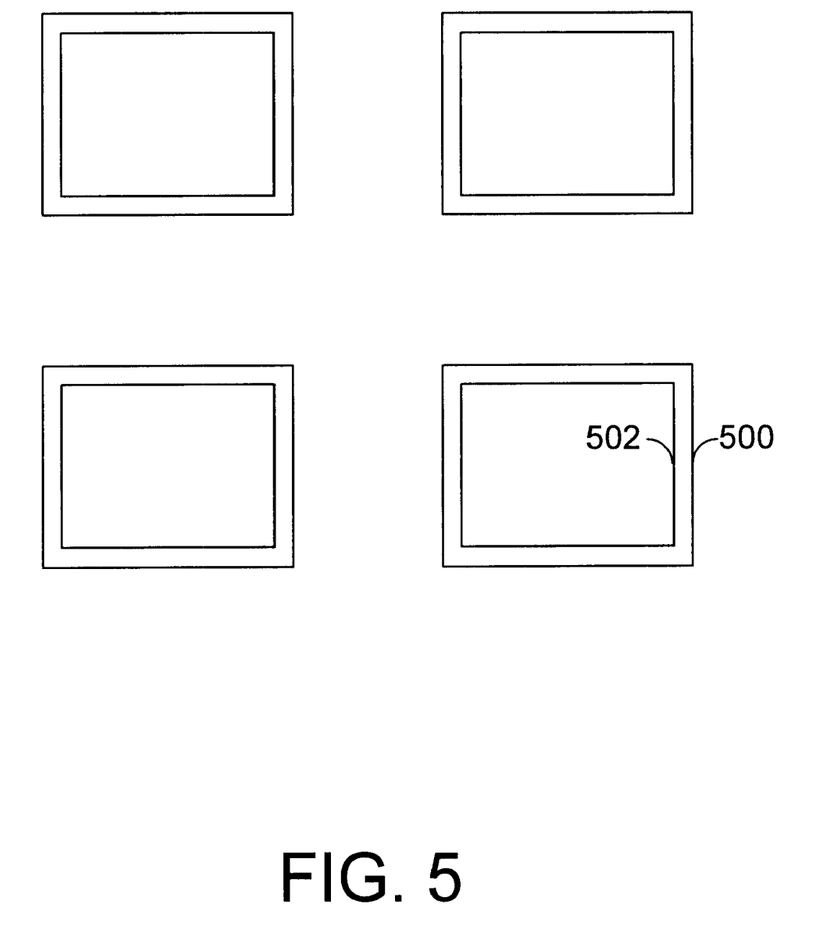
FIG. 5 is a scanned image of a slide holder.
Figure 6:
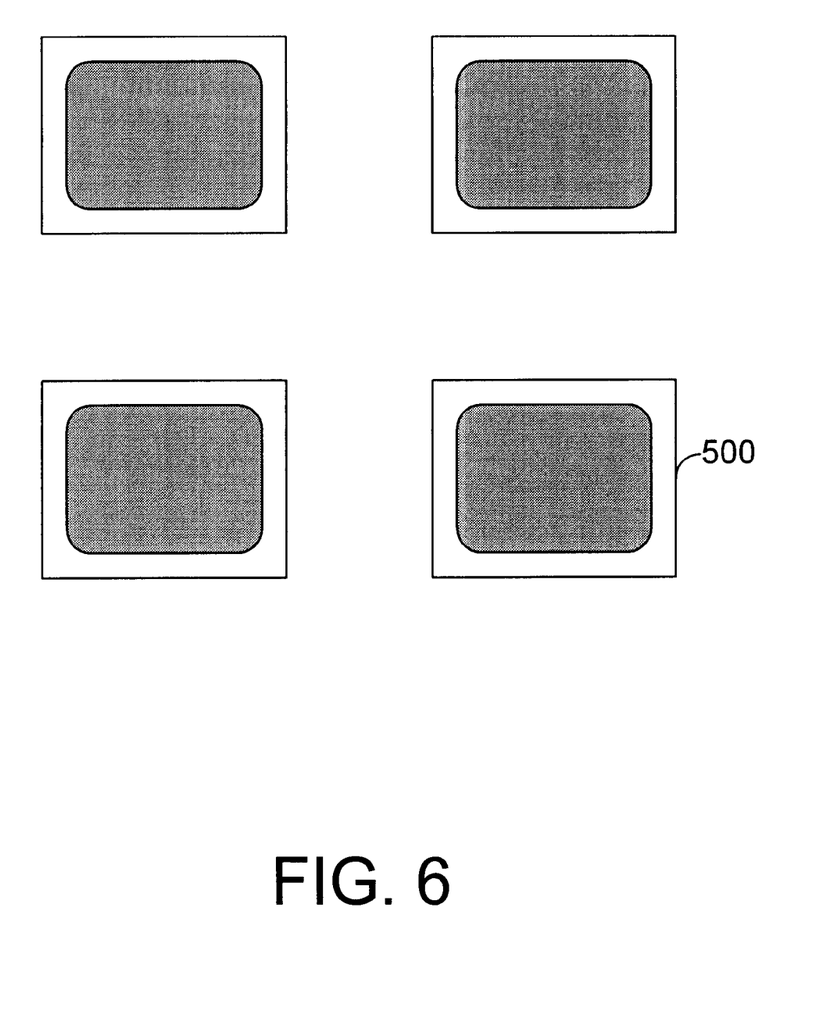
FIG. 6 is a scanned image of the slide holder of FIG. 4 with slides.
Figure 7:
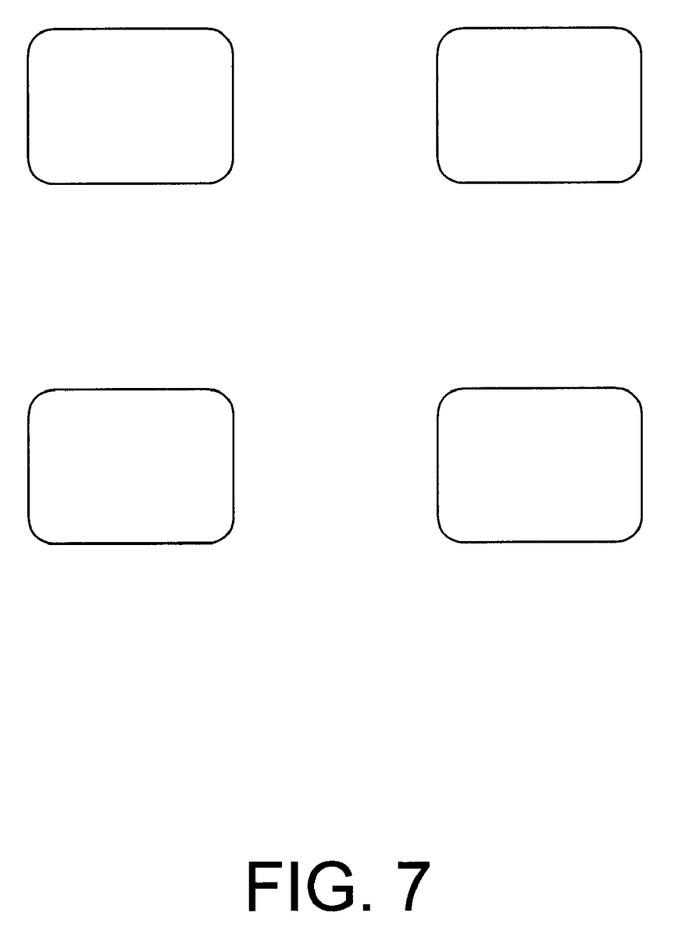
FIG. 7 is an edge map of the image of FIG. 6 after image analysis to remove the background.

FIGS. 5–7 illustrate another example application of the invention. FIG. 5 illustrates a holder for four slides, for example, for 35 mm slides mounted in cardboard or plastic frames. The holder may have, for example, indented areas having an outer perimeter 500 and rectangular openings 502. FIG. 6 illustrates the holder of FIG. 5, with four slides being held. The cardboard or plastic frames obscure the perimeters of the openings 502 in FIG. 5. FIG. 7 illustrates the result of applying the first comparison method to edge maps of the images depicted in FIGS. 5 and 6. Note in FIG. 7 that the outer rectangle (FIGS. 5 and 6, 500) is eliminated because corresponding edges appear in both edge maps. Note also that for the outer rectangle, wide edge lines are appropriate, and any noise pixels remaining after comparison may be eliminated by eliminating binary ones that are close to edges in the background edge map, or by area filtering, as discussed above.

Figure 8:
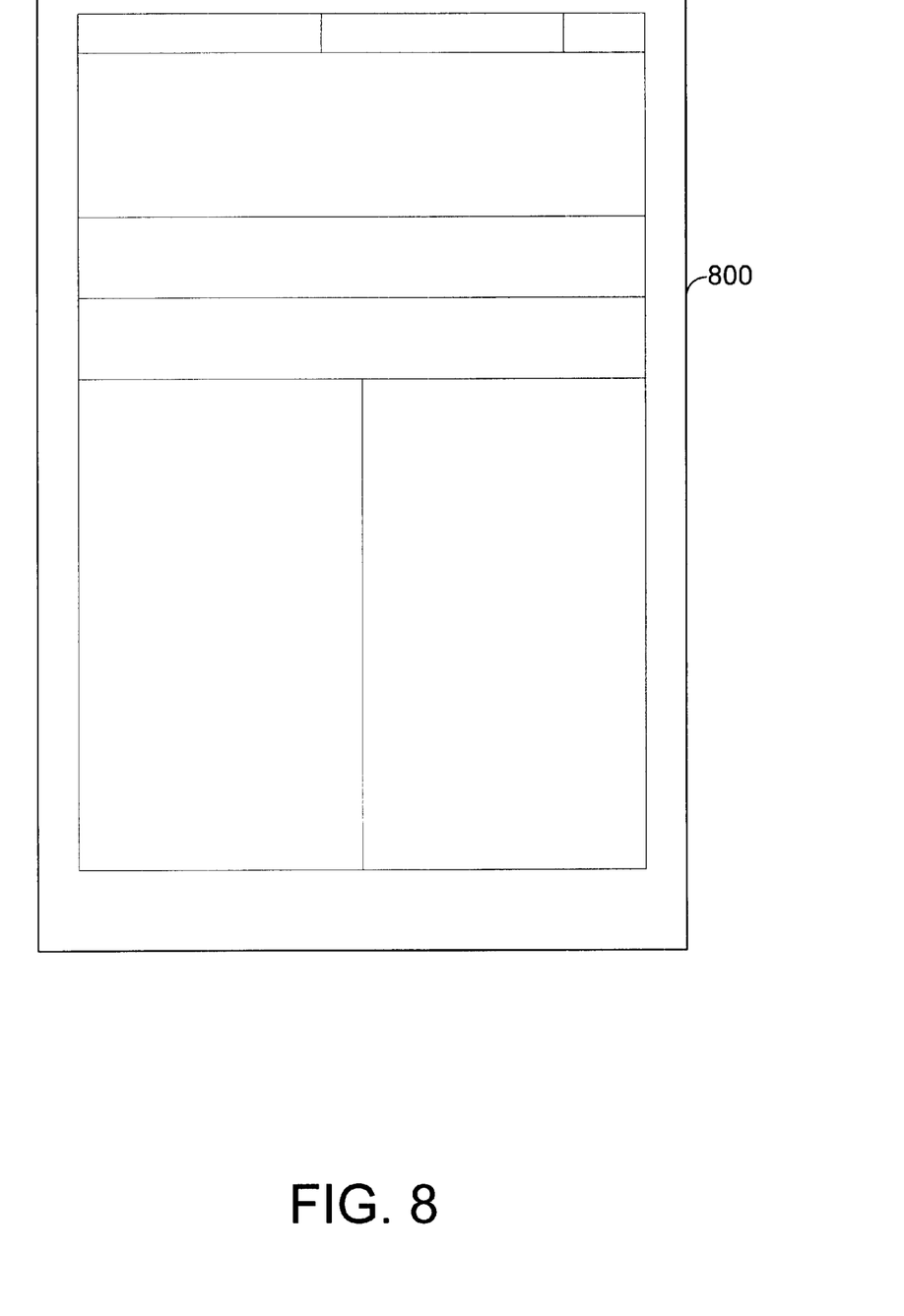
FIG. 8 is a scanned image of a blank form.
Figure 9:
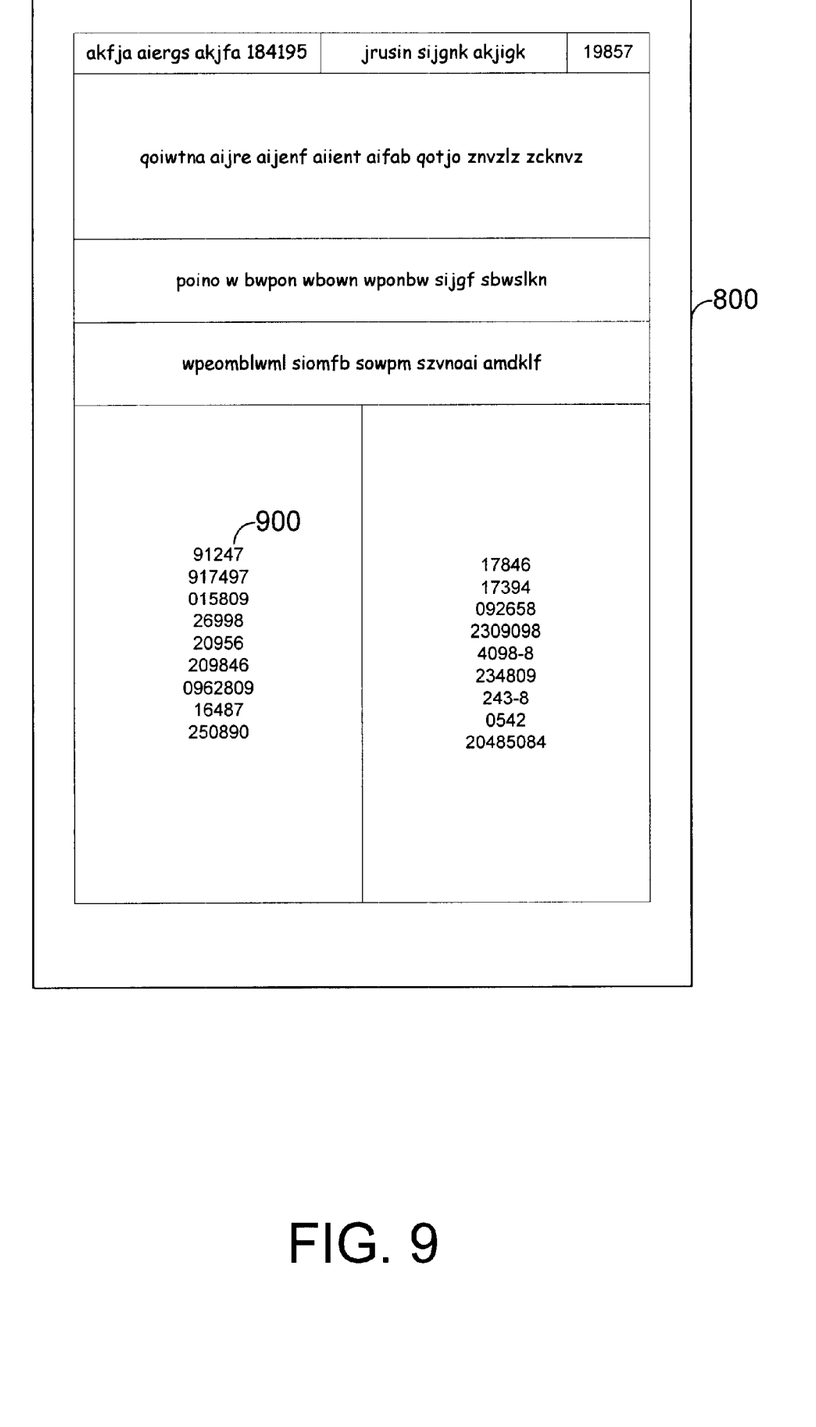
FIG. 9 is a scanned image of the form of FIG. 8 with added information.
Figure 10:
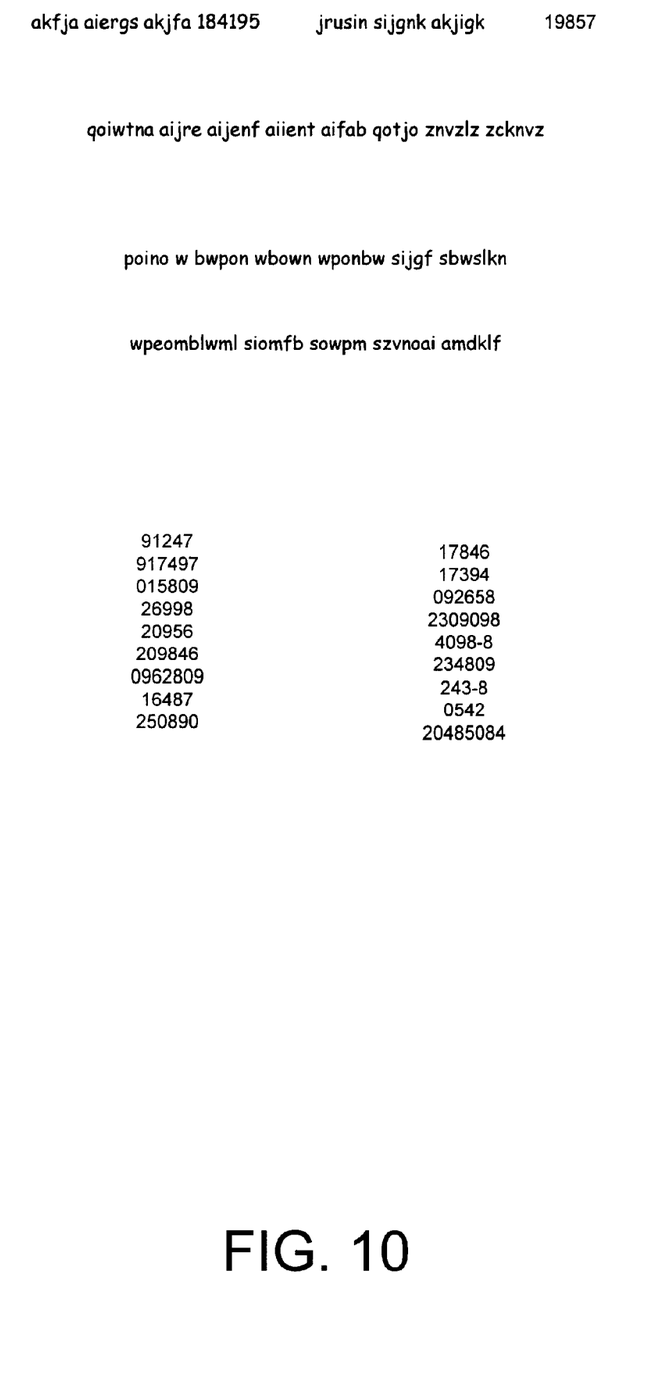
FIG. 10 is the image of FIG. 9 after image analysis to remove the background.

FIG. 8 illustrates an image of a blank form, which may also have preprinted text (not illustrated). FIG. 9 illustrates an image of the form of FIG. 8 filled in with added text of interest 900. Edge maps are appropriate for identifying images of interest where the images of interest are bounded by lines, but are less appropriate for identifying areas of text. Accordingly, for forms or templates, edge maps may be used to identify the background form or template, but for extraction of the image of interest, the second comparison method is preferred, where the second method is applied directly to the images depicted in FIGS. 8 and 9, not edge maps. FIG. 10 illustrates the result of applying the second method to images of FIGS. 8 and 9 (with noise removal as appropriate).

In FIGS. 4 and 7, resulting edge maps indicate areas containing images of interest. In FIG. 10, edge maps may be used to eliminate regions outside the document, for example, automatic document feeder rollers as in FIGS. 2 and 3, and then, given the document region of the interest, the text information of interest is extracted directly without the use of edge maps.

Figure 11A:
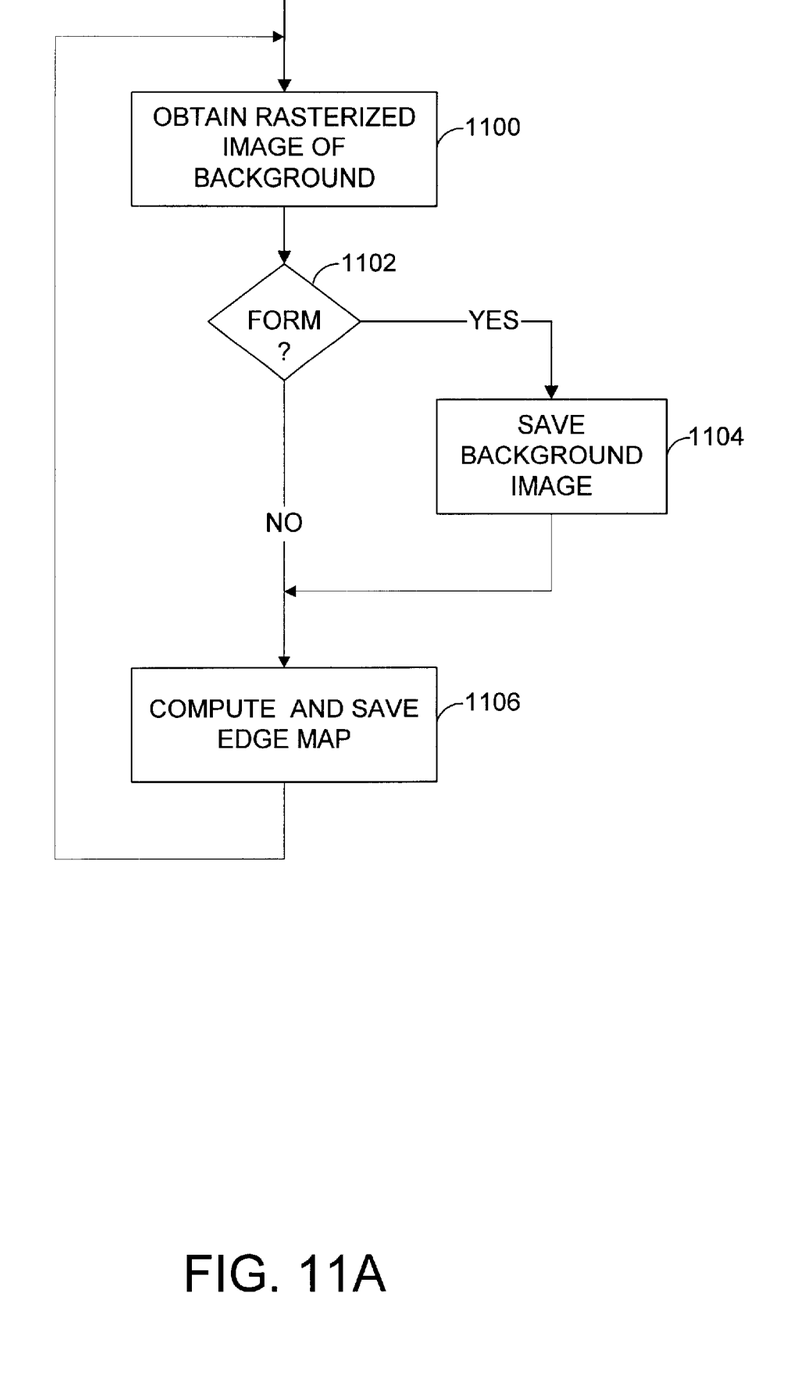
FIGS. 11A and 11B are flow charts of a method in accordance with the invention.
Figure 11B:
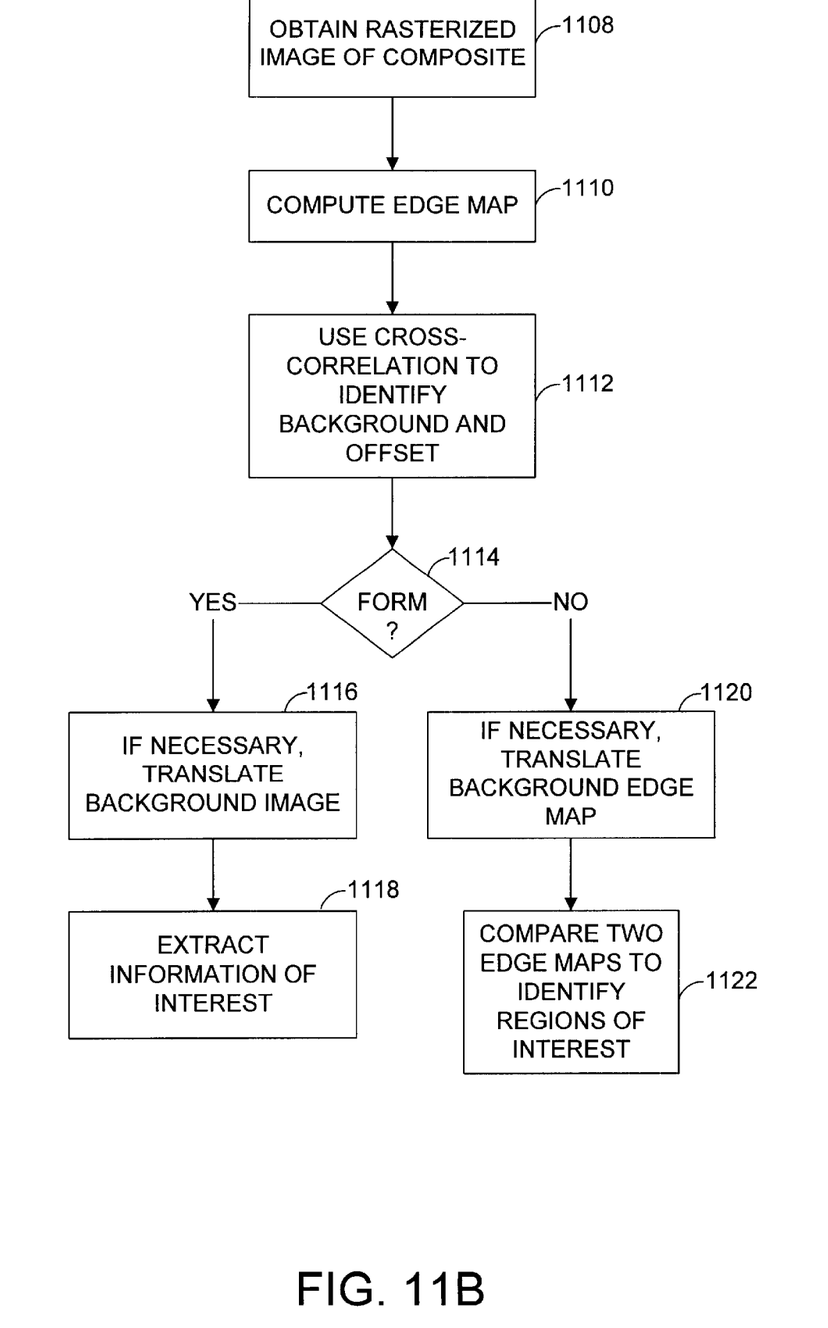

FIGS. 11A and 11B are flow charts of a method in accordance with the invention. In FIG. 11A, at step 1100, a rasterized image of a background is obtained. At step 1102, if the background is a form or template, then the background image is saved (step 1104). At step 1106, an edge map of the background image is computed and saved. Steps 1100–1106 may be repeated as many times as necessary to build a library of expected backgrounds of interest. Alternatively, steps 1100–1106 may represent obtaining data for a single new background.

In FIG. 11B, at step 1108, a rasterized image of a composite of a background and an image of interest is obtained. At step 1110, an edge map of the composite image is computed. At step 1112, the edge map of the composite image is cross-correlated, using two-dimensional cross-correlation, with each of the stored background edge maps. The cross-correlation having the highest peak indicates which background is most likely. The location of the peak within the two-dimensional cross-correlation indicates whether the background has shifted between scans. At step 114, if the subject of interest is a form (or template), then at step 1116 the background image is translated if necessary (determined during step 1112) and the shifted background image is deleted from the composite image (for example, by using the Exclusive-OR function). If the subject of interest is not a form, then at step 1120 the background edge map is translated if necessary, and at step 1122 any background edges visible in the composite edge map are deleted (for example, by using the first comparison method discussed above). The remaining edges in the resulting edge map are used to identify one or more images of interest.

Note, in FIGS. 11A and 11B, steps 1102 and 1114 may be part of a user interface for an operator decision.

Alternatively, at step 1102, some backgrounds may be identified by an operator as forms and that identification may be stored and associated with the background edge map, and then at step 1112, when the background is identified, the system may automatically identify certain backgrounds as forms.

Note that a flat-bed image scanner was used in FIG. 1 to illustrate an example of a device for obtaining rasterized images. However, the invention is equally applicable to sheet feed scanners, hand-held scanners, digital cameras, and any other devices used to obtain raster images that may include a plurality of expected backgrounds. Note, however, if imaging devices may move between exposures, for example, digital cameras that are not attached to something stationary, then additional image pre-processing may be required. For example, the background edge maps may have to be scaled to compensate for two exposures at two different distances, or the background edge maps may have to be warped, to compensate for two exposures at different angles.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of distinguishing an image of interest from a background, comprising:

scanning a plurality of backgrounds to form background images;

extracting features of each background image;

saving the features of each background image in memory;

scanning a composite image comprising the image of interest and an image of at least a portion of one of the plurality of backgrounds;

extracting features of the composite image;

correlating features of the composite image to features of one of the background images in memory; and deleting portions of the composite image having features that match features of one of the background images in memory.

2. The method of claim 1, the step of extracting features of each background image further comprising:

detecting edges in each background image.

3. The method of claim 1, the step of extracting features of the composite image further comprising:

detecting edges in the composite image.

4. The method of claim 1, further comprising the following step before the step of comparing features of the composite image to features of one of the background images in memory:

translating one of the background images in at least one dimension.

5. The method of claim 1, further comprising:

saving at least one of the background images in memory.

\* \* \* \* \*